(12) United States Patent
Zivojinovic

(10) Patent No.: US 6,343,632 B1
(45) Date of Patent: Feb. 5, 2002

(54) JIG FOR FITTING LOCKS TO DOORS

(76) Inventor: Zarko Zivojinovic, 5 Clack Road, Villawood, New South Wales, 2213 (AU)

( * ) Notice: Subject to any disclaimer, the term of this patent is extended or adjusted under 35 U.S.C. 154(b) by 0 days.

(21) Appl. No.: 09/508,591

(22) PCT Filed: Sep. 10, 1998

(86) PCT No.: PCT/AU98/00741

§ 371 Date: May 23, 2000

§ 102(e) Date: May 23, 2000

(87) PCT Pub. No.: WO99/12710

PCT Pub. Date: Mar. 18, 1999

(30) Foreign Application Priority Data

Sep. 10, 1997 (AU) .............................................. PO9088

(51) Int. Cl.[7] .............................. B27M 3/34; B27M 1/08
(52) U.S. Cl. .............................. 144/27; 33/197; 33/539; 144/3.1; 144/35.1; 144/92; 408/115 R; 408/241 G
(58) Field of Search ..................... 33/197, 539; 144/3.1, 144/27, 35.1, 70, 92; 408/95, 97, 115 R, 241 G

(56) References Cited

U.S. PATENT DOCUMENTS

| | | | |
|---|---|---|---|
| 2,790,470 A | * 4/1957 | Graham | 144/3.1 |
| 3,302,674 A | 2/1967 | Russell et al. | 408/241 G |
| 3,327,573 A | 6/1967 | Prussiano | 408/115 R |
| 3,363,487 A | * 1/1968 | Gohm, Sr. | 408/115 R |
| 3,500,884 A | 3/1970 | Hand et al. | 144/3.1 |
| 4,445,277 A | 5/1984 | Keefe | 33/197 |
| 5,146,961 A | * 9/1992 | Schoeller | 408/115 R |

FOREIGN PATENT DOCUMENTS

| | | |
|---|---|---|
| DE | 1301890 | 8/1969 |
| EP | 0498510 | 8/1992 |
| GB | 2075911 | 11/1981 |
| GB | 2238749 | 6/1991 |

\* cited by examiner

*Primary Examiner*—W. Donald Bray
(74) *Attorney, Agent, or Firm*—Edwin D. Schindler

(57) ABSTRACT

A jig (11) for removable fitment along the edge of a door (19) which provides a suitable combination of guides and stops to allow the location and operation of suitable cutting tools such as drills or routers. The jig comprises a pair of parallel guide plates (26) the distance between which is adjustable for removable fitment to opposing surfaces of the door. Guide holes (30, 31, 32) are located in the guide plates through which a drill or other suitable tool may be inserted. The jig has guide means (12) associated therewith for allowing location of a suitable tool at the edge of the door for making a cylindrical hole or for machining a mortise therein for receiving the body of a mortise lock or a rebate for receiving the face plate of the lock mechanism. A guide block (50) to facilitate accurate drilling is also disclosed.

14 Claims, 4 Drawing Sheets

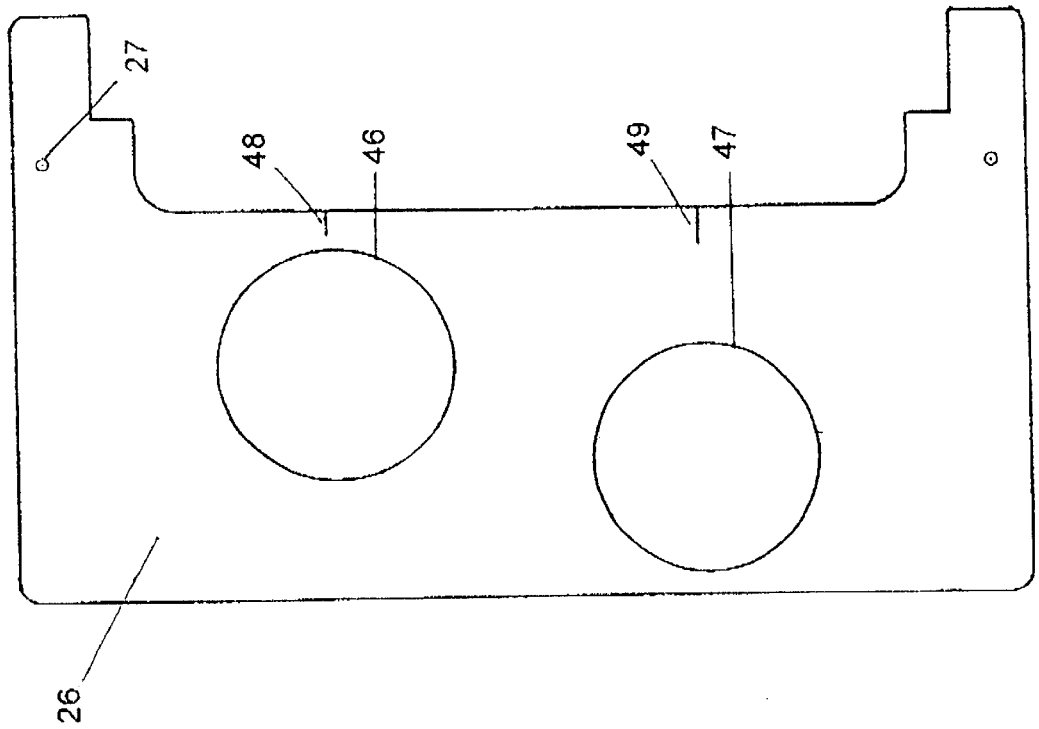
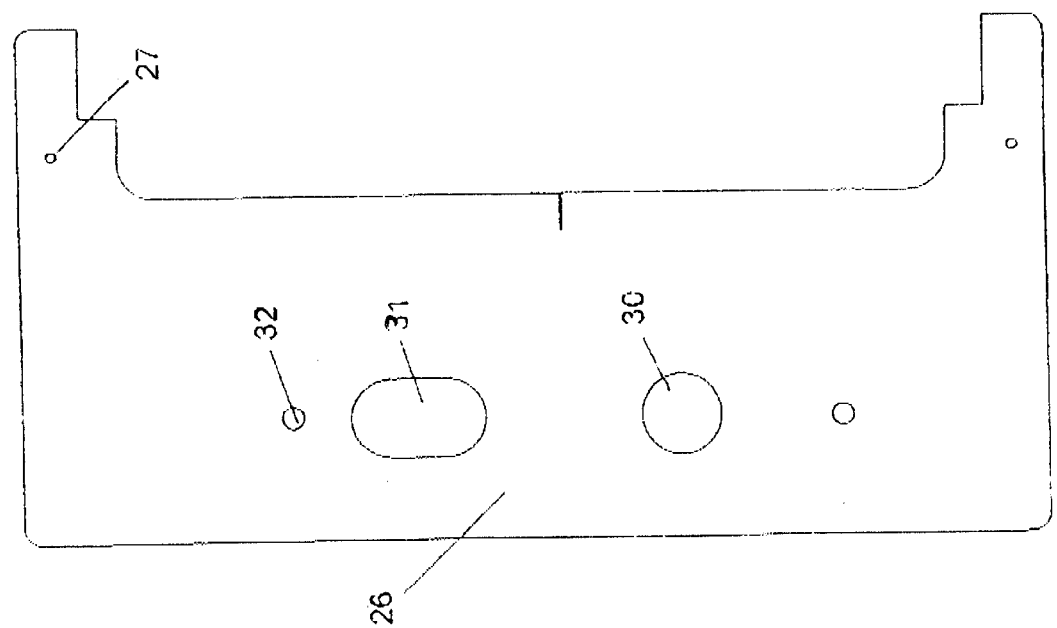

JIG FOR FITTING LOCKS TO DOORS

TECHNICAL FIELD

This invention relates to means for affixing locks in doors, and in particular relates to an adjustable jig suitable for affixing temporarily along the edge of a door for guiding the cutting action of suitable cutting tools such as drills and/or routers and the like in order to make appropriate holes or recesses in the door for receiving the lock mechanism.

BACKGROUND OF THE INVENTION

Conventionally, fixing a mortise lock or a cylindrical lock to a door is a time consuming operation. Firstly, it is necessary to mark the location of the various holes and recesses on the side and edge of the door into which the lock mechanism must be fitted. Typically, this is achieved by using a suitable stencil, for example a paper stencil, to mark the various locations where drilling and other operations such as routing etc must be carried out. Using these markings, various tools are then employed to create a mortise in the edge of the door to receive the body of a mortise lock or a cylindrical hole to receive the bolt of a cylindrical lock. Then a rebate must be cut in the edge of the door to receive the face plate of the lock so that it fits flush with the edge of the door.

In addition. a hole or holes must be drilled through the door perpendicular to the mortise or cylindrical hole in order to accommodate the shaft which supports the handles and/or the barrel or cylinder of the lock itself. Furthermore, additional holes need to be pre-drilled to accommodate the several screws which affix the lock mechanism and where necessary the cover plates in the case of a mortise lock, the primary fixing generally being through the face plate on the edge of the door.

Where a fit-out is being performed either in a new building or as a result of refurbishment of an existing building, and irrespective of whether it is an industrial, commercial or domestic building, it is of course also desirable to fit all the locks in their respective doors at the same height throughout the building.

However, one of the major problems in using a stencil or paper template is that it can easily move during the marking operation. Furthermore, once the positions are marked, there is no guarantee that subsequent drilling or other operations would be performed accurately. Consequently, there is a likelihood that not only will locks be fitted at varying heights, but that, worse still, they will be fitted somewhat out of alignment causing undue stress on the lock mechanism.

In addition, there is a high likelihood that damage will occur to the door not only during the operation of marking out the location of the lock but more importantly as a result of slippage of tools whilst performing the various drilling and mortising functions. This is particularly true when considering the difficulties encountered whilst installing a mortise lock. By its very nature, a mortise lock requires the preparation of a relatively deep mortise in the edge of the door, the width of which is generally not that much less than the thickness of the door itself, leaving essentially only a thin wall remaining in each face of the door into which the lock mechanism is fitted. Naturally, during the process of preparing the mortise, there is a likelihood that the relevant cutting tool will slip, whether it be a router, drill bit, chisel etc, thereby causing it to tear or break through this thin-walled section with generally unrepairable consequences.

Although it is generally known to employ various jigs for carpentry and joinery, in order to facilitate drilling, routing and other operations, these do not specifically address the particular problems encountered in preparing the mortise for mortise locks and/or the other relevant holes etc for such locks or even preparing the relevant holes for cylindrical locks. This generally follows because such a jig is a non adjustable mechanism designed for a specific function. No such jig appears to have been designed for the specific purpose of preparing a door to receive either a mortise lock or a cylindrical lock in its entirety. Even where jigs have been developed which are multi functional or multi-purpose, generally through the use of adjustable guides or templates, they are of such a bulky and cumbersome nature, that they are consequently ill-suited for use in the preparation of the door when preparing it to receive a lock mechanism.

Thus, for example, one could employ an adjustable jig as described in Australian Patent No 509869, by locating same on the edge of the door for the sole purpose of preparing the mortise to receive a mortise lock, or alternatively a suitable hole to receive a cylindrical lock. However, this jig is a cumbersome arrangement and there is no ready facility to ensure that the jig would be set at a constant height, particularly as it could easily move out of adjustment between application from one door to another. In other words, even if a suitable reference point were established on the jig for setting against a relevant marking on the door, the very geometry of the jig construction would not necessary mean consistency in height.

More importantly however, the type of jig described in the aforementioned prior art fails to provide any additional facility to allow the preparation of a suitable rebate to receive the face plate of the lock mechanism or indeed preparation of the holes through the door perpendicular to the mortise or cylindrical hole as the case may be, for fitting the handle and/or lock barrel/cylinder etc.

Thus, previously known adjustable jigs are limited in that they do not provide a comprehensive solution for the number of preparatory steps in setting a lock in a door. In particular, known jigs and guides do not provide any facility for location at a constant height, nor indeed do they provide satisfactory methods for stopping the router or drill travel which must necessarily be controlled manually, either in terms of the depth reached or travel along the edge of the door where a mortise is required. Also they do not provide effective or comprehensive solutions for the preparation of the remaining aspects of fitting the lock, including the rebate for the face plate, and suitable holes for the handle shaft and lock barrel.

Although the following description refers generally to the preparation of a door to receive a mortise or cylindrical lock, it will be appreciated that no such limitation is thereby intended and any analogous requirement, where the invention may also be utilised, by suitable modification if necessary, is also intended to be encompassed. Thus for example, simple door latches which do not actually have the facility to be locked are also included. Any similar situation where a lock or similar mechanism (whether lockable or otherwise) may equally benefit from the application of the principles embodied in the invention is therefore also contemplated by the following disclosure.

In the light of the foregoing, it would therefore be advantageous to provide a suitable jig or guide system capable of fitment to a door, without damage thereto, which would allow for the comprehensive preparation of the door to receive the various components of a mortise and/or cylindrical lock or other similar latch mechanism, whilst providing uniformity of location and fitment thereof and comprehensive ease of use. It would be especially advantageous if the same jig construction were able to accommodate preparation of the door for either a mortise lock or a cylindrical lock by means of suitable adjustments therereto or simple replacement only of relevant guide plates suited to the particular requirement.

OBJECT OF THE INVENTION

It is therefore an object of the invention to provide a comprehensive solution to the problems of fitting mortise and/or cylindrical locks or similar latch mechanisms to a door, which overcomes or at least ameliorates the foregoing shortcomings and disadvantages of presently known means of performing such operations. It is a further object of the invention that it should accommodate the fitting of both mortise and cylindrical locks as required. At the very least, the invention provides an alternative to known methods of preparing a door to receive a lock.

DISCLOSURE OF THE INVENTION

According to the present invention, there is provided a jig for removable fitment along the edge of a door without damage thereto and which provides a suitable combination of guides and stops to allow the location and operation of suitable cutting tools such as drills or routers therein, in order to prepare the door for receiving either a mortise or cylindrical lock mechanism or similar, the jig comprising a pair of parallel guide plates the distance between which is adjustable for removable fitment to opposing surfaces of the door adjacent the edge of the door in the area to which the lock is to be fitted and hence for securement of the jig to the door during preparation of the door for receiving the lock; guide holes located in the guide plates through which a drill or other suitable tool may be inserted for drilling suitable holes through the door for receiving the handle shaft and/or lock barrel or the drilling of the lock mechanism; the jig having guide means associated therewith for allowing location of a suitable tool at the edge of the door for preparing a cylindrical hole to receive a bolt in the case of fitting a cylindrical lock, and location at and travel along a predetermined length of the door edge for preparing a mortise therein for receiving the body of a mortise lock or a rebate for receiving the face plate of the lock mechanism.

It will be advantageous to provide a separate pair of guide plates for use in preparing a door to receive a mortise lock as opposed to the pair of plates required to prepare the door for receiving a cylindrical lock. Preferably therefore, the jig is provided with interchangeable guideplates, suitable for the preparation of the respective holes/recesses required for fitting a mortise lock or a cylindrical lock or indeed any other lock by suitable modification as the case may be.

Preferably, in the case of fitting a mortise lock, the guide plates will also provide holes through which a suitable drill may be inserted for drilling the holes to receive the screws which affix each cover plate of such a lock mechanism on respective sides of the door. This is not relevant in the case of a cylindrical lock a the cover plates in this type of mechanism are generally not affixed to the door itself but rather to the lock mechanism in what may be termed secret fixing.

In considering a mortise lock, there is generally one standard dimension employed and consequently the holes in these plates will correspond with the shaft upon which the handles are mounted, and where a lock barrel is provided a hole corresponding thereto as well as holes to locate the screws for the respective cover plates.

In considering cylindrical locks however, there are two major types, namely those having the centre of the cylinder located at a distance 60 mm from the edge of the door and those whose centre is located 70 mm from the edge of the door. A single pair of plates however (of the same height as that utilised for the mortise lock) can easily accommodate a pair of holes corresponding to each of these dimensions so that in use one or other only of the pair of holes is selected and utilised for the relevant lock dimension.

The means for removably fitting the guide plates to the respective faces of the door and hence securing the jig to the door during the preparation of the door to receive the respective lock is preferably provided in the form of simple clamping means (eg a positioning screw arrangement) operating directly on the guide plates. Thus, for example, this is accomplished in a preferred embodiment of the invention, in which the jig comprise a pair of fork members located at the extremities of a pair of guide rails. The distance between the arms of each fork is greater than the width of the door to which the jig is to be fitted so that in use the forks are located about the edge of the door and located so that the arms of the forks extend over and above the surface of the door, whilst the guide rails supporting the forks also remain away from the edge of the door. Conveniently, the fork are each provided with a single point or line of contact (eg V-shaped extension) along at least a portion of the inner face between their arms and in the case of a line contact, preferably perpendicular thereto and therefore located along the axis of the door in use, the purpose of which is two-fold, namely to allow the jig to be centred by locating the point or line of contact along a centre line on the edge of the door and secondly to provide thereby only minimal contact of the forks (and hence the jig) along the edge of the door where damage might be greatest if contact was not thus minimised.

Extending inwardly from each arm of each fork member, perpendicular to the face of the door about which the forks are to be mounted, there is provided a pin element, the four pin elements thus cooperating so that each of the respective guide plates extends between and is slideably mounted upon the corresponding respective pair of left or right pins, each guide plate thus extending between the corresponding left or right arms of the upper and lower pairs of forks as the case may be (as viewed when looking at the edge of the door to which the jig is to be mounted).

A screw member acting through each of the four arms of the pair of forks, perpendicular to the plane of the door and operating against the respective guide plate in that vicinity is thus able to independently adjust the position of and consequently in co-operation with the corresponding screw member on the opposite side of door to which the jig is to be affixed, clamp the respective guide plates against opposing sides of the door when the jig is thus located along the edge thereof. Therefore the guide plates are clamped to the door during use, the only other contact being the point or line of contact along the centre of the edge of the door for locating the forks as described above. Thus damage to the door is eliminated by virtue of the use of relatively large guide plates affixed in this way, the pressure exerted by the positioning screws being distributed thereover.

Whilst of course it is necessary to locate the positioning screws for clamping the plates at a convenient distance along the arms of the forks at locations where they extend over the surface of the door in use, it will conversely be necessary to locate the pins on which the plates are slideably supported in those regions of the respective arms of the forks which do not extend over the surface of the door, that is to say by creating suitable pockets of space into which they can extend when the jig is brought up to and affixed to the door. Such pockets are readily formed as a result of the aforementioned arrangement which provides a central point of contact only to facilitate alignment of the jig to the door.

Preferably, the guide means for allowing location of the relevant cutting tool for making a hole for the bolt of a cylinder lock, or in the case of a mortise lock, the location as well as the travel of the relevant tool to prepare the mortise, is provided in a preferred embodiment in the form of a sliding block mounted on the support rails which support the forks as described above. These support rails are preferably round shafts along which the sliding block is free to move. Travel of the sliding block is preferably restricted by the use of adjusting pins mounted in the fork components which either locate the block at the desire height for drilling the hole for the cylindrical lock or allow sufficient travel of the block for a router like tool or other suitable cutting tool or bit located therein for preparing a mortise for a mortise lock and/or the rebate for the face plate.

Preferably there is also provided in conjunction with the sliding block suitable stop means to prevent the relevant tool from cutting deeper than is required for the mortise or rebate for the face plate as the case may be.

In a further preferred embodiment there is also provided an additional guide block to facilitate accurate drilling when drilling through the guide plates and door to prepare the door for receiving the handle shaft and/or lock barrel or the like of the lock mechanism. This may be achieved by providing a removable side block slideably mounted on and rotatable about one of the support rails and which is able to be removed and relocated onto the other support rail as required for drilling through the opposite face of the door, the side block having a drill bit rotateably mounted in a suitable bearing located in the block so that the chuck of a drill may be affixed to a non working end of the drill bit, so that in use, the side guide block with the working end of the drill bit extending therethrough is able to be brought into alignment with the corresponding holes in the guide plates for drilling therethrough and maintained in that position whilst drilling is performed. In this way there is less likelihood that that the sides of the drill bit will make contact with the edges of the hole in the guide plate, which could lead either to causing damage to the edges of the guide hole itself or the sides of the drill bit, or worse still causing the drill bit to bind or be thrown off at some unwanted and potentially dangerous angle.

BRIEF DESCRIPTION OF THE DRAWINGS

An embodiment of the present invention will now be described with reference to the drawings in which:

FIG. 4 is a side elevation of the guide plate used in the embodiment of FIGS. 1 and 2, for use in preparing a door to receive a mortise lock, and FIG. 5 is a side elevation of an alternate guideplate, a pair of which may be interchanged with the guide plates as illustrated in FIG, 1, for use in preparing a door to receive a cylindrical lock.

BEST MODE OF CARRYING OUT THE INVENTION

Figure 1:
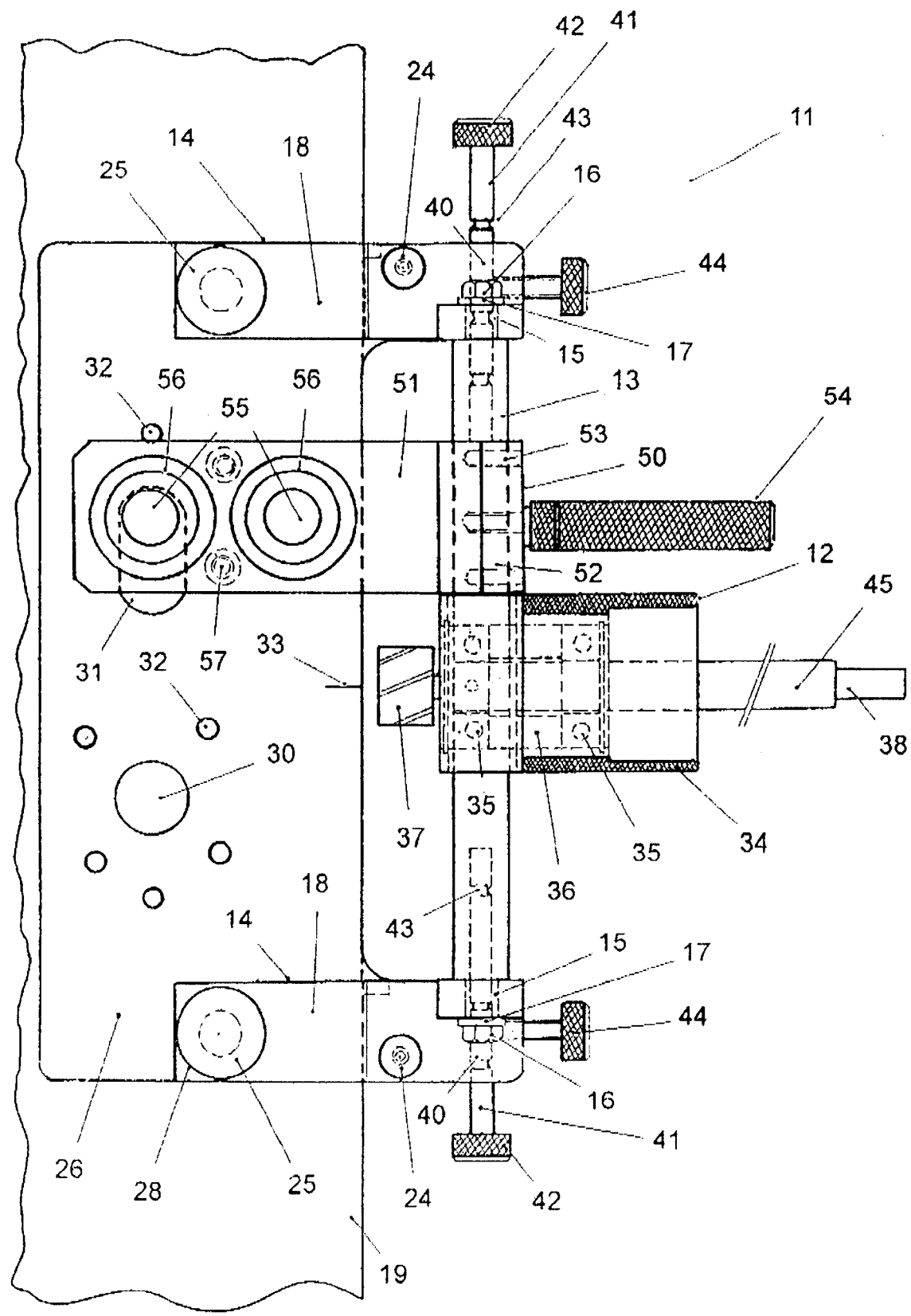
FIG. 1 is a side elevation of one embodiment of the invention, being a jig fitted with suitable guide plates and which is affixed to a door into which a mortise lock is to be fitted and wherein the jig is provided with both a sliding block mounted between two guide rails for allowing location of the relevant cutting tool for making a hole, mortise or rebate as required in the edge of the door as well as a side guide block for accurately locating a drilling tool for making holes through the door for the handle or barrel of the lock.
Figure 2:
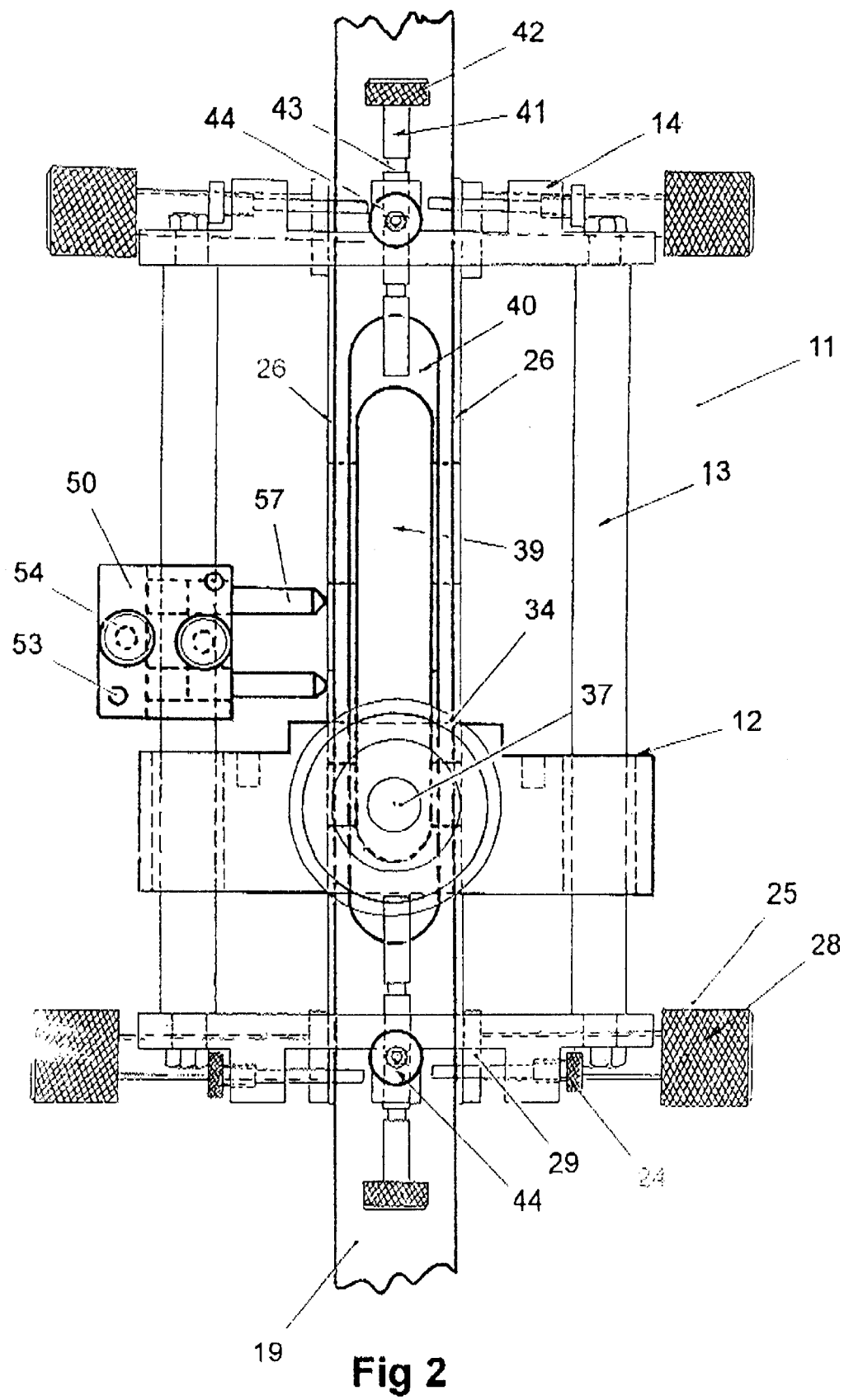
FIG. 2 is a front elevation of the embodiment of the invention depicted in FIG. 1 (that is to say as viewed when looking at the edge of the door), showing the areas of cutting tool or router bit travel when preparing the door to receive the body of a mortise lock and its corresponding face plate.

Referring generally to FIGS. 1 and 2 there is illustrated a jig, generally referenced 11, for preparing a door to receive a lock, in this case a mortise lock (not illustrated), according to a preferred embodiment of the invention.

Figure 3:
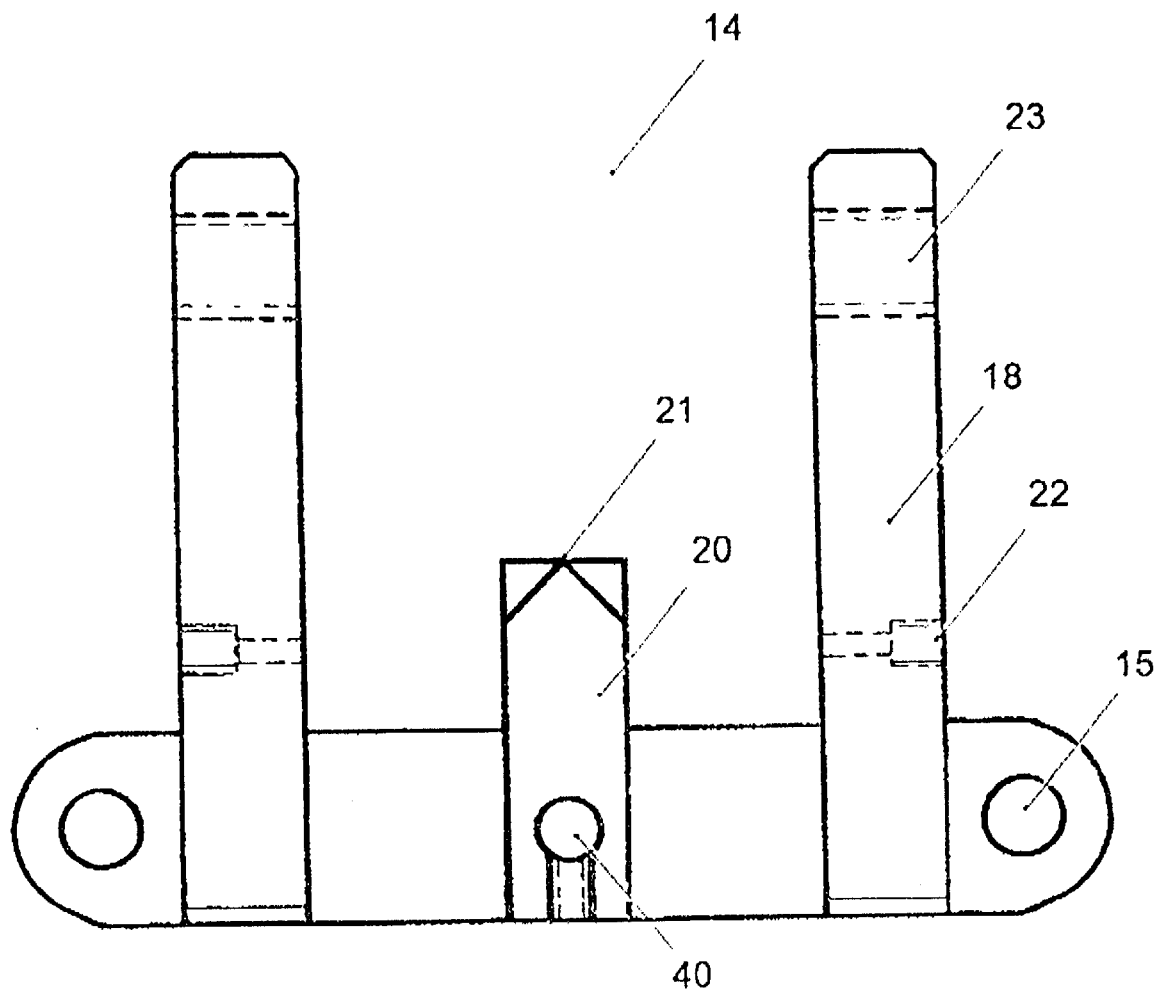
FIG. 3 is a plan view of the top fork arrangement as utilised the embodiments of FIGS. 1 and 2.

Jig 11, comprises a sliding block 12, mounted on a pair of support rails 13, which extend between and are fixedly attached to a pair of fork members 14. The detail of the fork members 14 on their own is also shown in FIG. 3. The fork members 14 are provided with holes 15 through which the ends of the support shafts 13 are attached to the fork members 14 by means of nuts 16 and washers 17.

The fork members 14, each have a pair of arms 18 which extend in use over the surface of a door 19 to which the jig 11 is to be fitted. Located centrally between the respective arm 18 of each of the fork members 14 is a central portion 20 which is provided at its upper extremity with a v-shaped portion 21 which acts as a centring guide and which in use prevents the bulk of the fork members 14 themselves from coming into contact with the door 19, except in that relatively small region of the door 19 which contacts with the central portion 20 in the region of the v-shaped portion 21 of the fork member 14.

Provided in each of the arms 18 of the fork members 14 are holes 22 and 23, through which are inserted guide plate mounting pins 24 and threaded positioning screws 25 respective. The guide plate mounting pins 24 are located within those regions of the arms 18 prior to their extension beyond the central portion 20 of the fork members 14 so that they do not interfere with or come into contact with the door 19 when the jig 11 is located thereon. The guide plate mounting pins 24 slideably support guide plates 26 which are slideably mounted thereon by means of mounting holes 27 located therein as illustrated in FIG. 4.

The heads 28 of the threaded positioning, screws 25 are provided with knurled surfaces to allow them to be screwed manually. The other extremity of each of the threaded screws 25 is provided with a foot in the form of a washer 29 rotatable thereabouts which acts upon the surface of the respective guide plate 26 in that vicinity when each respective screw 25 is tightened causing the guide plates 26 to be pressed against the surface of the door 19, thereby in turn causing the jig 11 to be clamped thereto.

The guide plates 26 are each provided with holes 30, 31 and 32 for drilling respectively the holes through the door 19 for the handle shaft. for the lock barrel and for the screws to secure the face plates (not illustrated). Also provided in the guide plate 26 is a centre line 33 for locating the jig 11 on the door 19 at the correct height.

The sliding block 12 is provided with a central knurled knob portion 34, which allows the sliding block 12 to be conveniently gripped and moved in use and which comprises therein pair of bearings 35 spaced apart by means of a suitable spacer ring 36. A router bit 37 or other suitable cutting tool is mounted within the bearings 35 and is able to rotate therein. The shaft 38 of the cutting tool 37 is able to be coupled to a drill or other suitable motor (not illustrated)

by known means to accomplish the operation of preparing the mortise 39 for the body of the lock or the rebate 40 for the face plate of the lock mechanism (not illustrated) in the edge of the door 19.

Provided in each of the fork members 14 are holes 40, through which are inserted adjusting pins 41. Each adjusting pin 41 has a knurled head 42 to facilitate gripping it for adjustment and is provided along its length with a number of grooves 43 spaced appropriately apart to allow for the correct travel of the sliding block 12. The adjusting pins 41 are located and locked in place by the action of the locking pins 44 which engage with the required grooves 43.

Located on one of the support rails 13 is a side block 50 which consists of a main body portion 51 and a detachable portion 52 which in use is affixed to the main body portion 51 by means of grub screws (not shown) inserted in holes 53. The side block 50 is able to swivel or rotate around the support rail 13. Handle 54 affixed to the block 50 facilitates such rotation. The guide block 50 is provided with holes 55 therethrough, about which are located suitable bearing surfaces 56 for receiving a suitable drill bit (not shown) which may be brought into alignment with the corresponding guide holes 31 in guide plate 26 as and when required. Spacing pins 57 located in the block 50 allow for the correct location of the side block 50 relative to the surface of the door 19 once it is swung into the position for drilling the relevant holes through the guide holes 31 in the guide plate 25 and thus through door 19.

In use, the width of the mortise 39 or rebate 40 will be determined by the size of the head of cutting tool 37, whilst the length thereof will be determined by the extent to which the sliding block 12 is allowed to travel along the support rails 13 by virtue of the placement and locking of the respective adjusting pins 41 in the forks members 14.

About the shaft 38 of the cutting tool there is also provided a replaceable spacer sleeve 45 which allows for positive control over the depth to which the cutting tool 37 is allowed to enter the edge of the door 19, specifically for the mortise 39 (which of course is a relatively deep pocket and for the rebate 40 for the face plate (which by contrast is shallow).

In use, the height at which the lock is to be located is marked on the edge of the door 19 and a centre line is also marked on the edge of the door 19 in that vicinity. With the correct cutting bit 37 inserted into the jig 11 for making the mortise 39, the jig 11 is fitted to the door 19 by aligning the centre mark 33 on the guide plate 26 with the height marked on the door 19. The jig 11 is then clamped to the door 19 and centred thereabouts by tightening up the threaded positioning screws 25 whilst lining up the two raised centre portions 21 of each fork member 14 with the centre line marked on the edge of the door 19.

A centre punch (not shown) is then conveniently inserted into each of the holes 30, 31 and 32 in each guide plate 26 to facilitate commencement of drilling. In this regard, specially designed centring punches which automatically centre for each size of the respective holes will assist in this task and are contemplated as an adjunct to the invention. Using suitable spade bits or drill bits each of the holes can then be drilled. Furthermore, the use of the side block 50 facilitates accurate drilling by maintaining the drill bit perpendicular to the surface of the door to prevent accidental binding or slippage etc. The depth of holes 30, 31, the holes for the handle shaft and lock barrel) need only be sufficient to ensure that they intersect with the mortise 39 which is to be prepared next. It will be appreciated that it is not necessary and indeed preferable not to drill all the way through the door 19 from both sides. In this regard side block 50 may be easily removed and relocated on the other support rail 13 to assist in drilling accurately from the other side of the door. As far as the depth of the holes 32 is concerned they should be sufficient to receive the screws for affixing the cover plates (not shown).

Then, with the drill affixed to the shaft 38 of the cutting tool 36 already located in the sliding block 12 and with the adjusting pins 41 set in their correct positions for the desired length of mortise 39, the mortise 39 can then be prepared. This will be accomplished safely and accurately by guiding the sliding block 12 back and forth for sufficient passes between the adjusting pins 41 whilst maintaining sufficient pressure on the cutting tool 36 so that it cuts the mortise 39 without causing it to jam, until the require depth is achieved as determined by the appropriate spacer sleeve 45 located about the shaft 38.

Releasing the threaded positioning screws 25 on one side only of the door 19, jig 11 is then removed and the cutting tool 36 is changed for making the rebate 40 for the face plate. Jig 11 is fitted again to the door 19 using the previous markings (and tightening only those positioning screws 25 which were previously released) The adjusting pins 41 are then reset for making the rebate 40 for the face plate. Utilising, the appropriate spacer sleeve 45 to ensure the cutting tool or bit 36 cuts only to the desired depth, generally 2 mm, the rebate 40 is then cut. Jig 11 is once again removed. All that remains is to clean out the corners of the rebate 40 with a chisel (ie square up the corners) to receive the face plate and fit the lock.

Shown in FIG. 5 is the guideplate 26' for preparing the door to receive a cylindrical lock not (illustrated). The plate comprises two holes 46, 47 each located the correct distance for drilling of the required hole to accommodate the two respective sizes of available cylinder locks (ie 60 or 70 mm). Again centre lines 48, 49 are provided for each corresponding hole 46, 47.

The operation of the jig when used to prepare a door for a cylindrical lock is similar to that described above for the preparing the door for a mortise lock. However, a single hole only is made in each side of the door for the cylinder (at the appropriate dimension for the particular lock). Since only a cylindrical hole is required in the edge of the door rather than a mortise, the sliding block is simply allowed to rest on the lower adjusting pin 41 set of course at the appropriate height for the correct positioning of the bolt of the lock.

Although many different materials may be employed in the construction of the jig, it has been found useful to employ high tensile steel (4140) in the adjusting pins 41 and locking pins 44. Similarly the threaded positioning screws 25 and clamping washers 29 are best made of the same material. The sliding block 12 and fork members 14 may be conveniently made of mild steel, whereas it is preferred to make the support shafts 13 of bright mild steel. The shaft 38 of the cutting tool 37 is preferably silver steel. The spacer sleeve 45 is preferably made from stainless steel. The guide plates 26 are preferably manufactured from 2 mm stainless steel (grade 304).

The foregoing describes only some embodiments of the present invention, and modifications obvious to those skilled in the art can be made thereto without departing from the scope of the present invention.

What is claimed is:

1. A jig for a removable fitment along an edge of a door without damaging the door, said jig comprising:

a pair of guide rails;

a pair of fork members located at extremities of said pair of guide rails, with a distance between arms of each fork member of said pair of fork members being greater than the width of the door to which said jig is to be fitted, so that, in use, said fork members are located about an edge of the door and located so that said arms of said fork members extend over and above a surface of the door, while said pair of guide rails supporting said fork members remain at a distance from the edge of the door;

a pair of parallel guide plates with a distance between said parallel guide plates being adjustable for a removable fitment to opposing surfaces of the door adjacent the edge of the door in an area to which a lock is to be fitted to the door for securing said jig to the door during preparation of the door for receiving the lock, said parallel guide plates having guide holes located therein through which a tool is insertable for drilling holes through the door for receiving a handle shaft or a lock barrel of a lock mechanism for the door;

guide means for allowing location of the tool at the edge of the door for preparing a cylindrical hole for receiving a bolt of a fitting of a cylindrical lock, and location at, and travel along, a predetermined length of the edge of the door for preparing a mortise therein for receiving a body of a mortise lock or a rebate for receiving a face plate of the lock mechanism;

pin elements extending inwardly with one said pin element from each said arm of said fork member perpendicular lo a face of the door about which said fork members are to be mounted, said pin elements cooperating so that each respective said guide plate extends between, and is slidably mounted upon, a corresponding pair of said pin elements, said corresponding pair of pin elements being either left pin elements or right pin elements, and each said guide plate extending between a corresponding said arm, with said corresponding said arm being either a left arm or a right arm, of upper and lower said pairs of said fork members; and, means for removably fitting said pair of parallel guide plates to respective faces of the door for securing said jig to the door during preparation of the door for receiving the locking mechanism.

2. The jig for a removable fitment along an edge of a door according to claim 1, wherein said means for removably fitting said parallel guide plates to respective faces of the door is clamping means.

3. The jig for a removable fitment along an edge of a door according to claim 2, wherein said clamping means is a positioning screw arrangement operating directly on said parallel guide plates.

4. The jig for a removable fitment along an edge of a door according to claim 1, wherein said parallel guide plates are interchangeable guide plates for preparing a door for receiving a mortise lock and for preparing a door for receiving a cylindrical lock.

5. The jig for a removable fitment along an edge of a door according to claim 1, wherein for fitting a mortise lock, said parallel guide plates have holes through which a drill is insertable for drilling holes for receiving screws for affixing a cover plate of the mortise lock on opposing sides of the door.

6. The jig for a removable fitment along an edge of a door according to claim 1, wherein said pair of fork members are each provided with a line of contact along at least a portion of an inner face between said arms of said fork members and the line of contact along an axis of the door, in use, allows said jig to be centered by locating the line of contact along a center line on the edge of the door and to provide for only minimal contact of said fork members, and thereby said jig, along the edge of the door for minimizing damage thereto.

7. The jig for a removable fitment along an edge of a door according to claim 6, wherein said line of contact is a V-shaped extension.

8. The jig for a removable fitment along an edge of a door according to claim 1, wherein there are four of said pin elements cooperating so that each respective said parallel guide plates extends between, and is slidably mounted upon, a respective said pin element, each of said parallel guide plates thus extending between corresponding said arms, said arms being left arms or right arms of said pair of fork members.

9. The jig for a removable fitment along an edge of a door according to claim 1, further comprising screw members located through each of said arms of said fork members, perpendicular to a plane of the door and operable against respective said parallel guide plate to independently adjust a position of, and consequently in cooperation with, a corresponding said screw member on the opposing surfaces of the door to which said jig is to be affixed, clamp respective said parallel guide plates against the opposing surfaces of the door when said jig is located along the edge of the door.

10. The jig for a removable fitment along an edge of a door according to claim 1, wherein said guide means for allowing location of the tool at the edge of the door for preparing a cylindrical hole for receiving a bolt of a fitting of a lock is a sliding block mounted on support rails supporting said pair of fork members.

11. The jig for a removable fitment along an edge of a door according to claim 9, wherein said support rails are round shafts along which said sliding block is freely movable.

12. The jig for a removable fitment along an edge of a door according to claim 11, wherein travel of said sliding block is restricted via adjusting pins mounted in said pair of fork members.

13. The jig for a removable fitment along an edge of a door according to claim 12, further comprising stop means for said sliding block for preventing the tool from cutting deeper than required for the mortise or the rebate for the face plate.

14. The jig for a removable fitment along an edge of a door according to claim 10, further comprising a guide block for facilitating accurate drilling through said parallel guide plates and the door for preparing the door for receiving the handle shaft or the lock barrel of the lock mechanism for the door, said guide block being used in combination with a removable side block slidably mounted on, and rotatable about, a first of said support rails and which is removable and relocatable onto a second of said support rails as required for drilling through an opposing surface of the door, said removable side block having a drill bit rotatably mounted in a bearing located in said removable side block so that a chuck of a drill is affixable to a non-working end of a drill bit, so that, in use, said removable side block with a working end of the drill bit extending therethrough is capable of being brought into alignment with the holes in said parallel guide plates for drilling therethrough and maintaining position while drilling is performed.

* * * * *